United States Patent Office 3,281,361
Patented Oct. 25, 1966

1

3,281,361
GREASE COMPOSITIONS
Theodore H. Koundakjian, Berkeley, Calif., assignor to Chevron Research Company, a corporation of Delaware
No Drawing. Filed June 30, 1964, Ser. No. 379,345
6 Claims. (Cl. 252—51.5)

The present invention relates to thickening agents, particularly useful in forming high-temperature stable grease compositions. More specifically, the invention relates to high-temperature stable grease compositions thickened with certain 1,3 substituted triazenes, more particularly, triazenes formed by diazotization of certain aminoaryl diureas.

In recent years, it has become increasingly apparent that grease compositions must be provided that will lubricate effectively at high temperatures; that is, at temperatures in excess of 350° F., and particularly at ranges from 400 to 500+° F. Numerous government and industrial grease specifications now provide that grease compositions have minimum dropping points of 400° F. These requirements are, in general, the results of the increased power and speed of modern automotive equipment and aircraft. Contributing to the increased requirements is the expanded use of jet and turbine-type engines, which naturally operate at high temperatures and the increased speed of normal engine and gear train components, etc., which speeds increase the normally encountered operating temperatures. Another factor of importance is the extreme pressure conditions encountered in various types of modern machinery. With these increased pressures comes a significant rise in operating temperatures.

In the lubrication art, greases having relatively high dropping points have been produced from salts of certain fatty acids and other organic acids. For example, lithium salts of various fatty acids have been used to produce high dropping point greases. However, the metallic salts tend to contribute to the compositions ions, which promote oxidation of the lubricants themselves and additionally promote corrosion of the metallic parts being bathed in the lubricant. Further, greases with dropping points higher than about 450° F. have been found to be quite difficult to produce with thickeners of this type.

The grease compositions described in this application are beneficial in the lubrication of wearing surfaces in industrial plants wherever high temperatures are encountered; for example, in steel mill motors and transfer table bearings, paper mill roller bearings, etc. In heavy automotive equipment, such as in heavy duty trucks and moving equipment, the wheel bearings become extremely hot during braking periods and the compositions of this invention are especially suitable for lubricating these parts.

Greases prepared according to the present invention maintain grease consistencies at extremely high temperatures for long periods of time; such greases will remain unctious and not become hard or brittle at temperatures in the range of 350° F. to 500° F. These greases are surprisingly resistant to oxidation at these elevated temperatures and will, therefore, satisfactorily lubricate parts for long periods of time at elevated temperatures.

In accordance with the invention, it has been discovered that high temperature stable grease compositions are formed by the incorporation in an oil of lubricating viscosity of a 1,3 bis-(hydrocarbylureylenohydrocarbylenoureylenoaryleno) triazene, in which the hydrocarbyl radicals contain a total of from 2–72 carbon atoms.

Thus, the substituted triazenes of this invention may be represented by the general formula:

in which $R_1$ is a hydrocarbyl radical of 1–32 carbon atoms; $R_2$ is a hydrocarbylene radical of 1–32 carbon atoms, and Ar is a divalent aromatic hydrocarbon radical of 6 to 15 carbon atoms.

The substituted triazenes of this invention may be formed by the diazo coupling of two moles of an aminodiurea. Thus, the aminodiureas which are coupled may be dissimilar; however, the compounds may most easily be prepared by the simultaneous diazotization and coupling of the aminodiurea and thus the units would ordinarily be similar. On the other hand, a portion of one aminodiurea may be diazotized and coupled with an equimolar portion of another aminodiurea.

Suitable aminodiurea intermediates may be prepared by reacting one mole of a diisocyanate with one mole of a primary or secondary monoamine and one mole of an aromatic polyamine.

Examples of suitable monomines include the following: primary amines, such as methylamine, dimethylamine, isoamylamine, methyl-2-ethylhexylamine, aniline, diphenylamine, octadecylamine, naphthylamine, cyclohexylmethylamine, butylamine; secondary amines, such as piperidine, dimethylamine, diisopropylamine, di-n-butylamine, diethylamine.

$R_2$ in the formula, which is derived from the diisocyanate, is hydrocarbylene and may be either alkylene or arylene. The radicals may be substituted radicals containing various reactive substituents, such as hydroxy, carboxy, halo, nitro, etc. Examples of suitable aromatic radicals include orthophenylene, meta-phenylene, para-phenylene, tolylene, dimethyl phenylene, naphthylene, methylene-bis-phenyl, and biphenylene, etc. Examples of suitable alkylene radicals include ethylene, trimethylene, tetramethylene, and branch chain alkylene radicals, such as isopropylene, etc.

Suitable aryldiamines from which Ar in the formula is derived include benzidene, ortho, meta, para phenylene diamines, diaminonaphthalenes, such as 1,2-, 1,4-, 1,5-, 1,6-, 2,3-, and 2,6-naphthalene diamines.

The aminodiureas may be prepared separately; may be prepared in an inert solvent, which is then evaporated; or, more preferably, they may be prepared in situ. Preparation in situ comprises mixing the amines and the isocyanates together, utilizing as a solvent a portion of the oil that is to serve as the lubricant base, heating the mixture in a reaction vessel at temperatures from about 70° F. to 600° F. for a time sufficient to cause formation of the intermediate aminodiureas.

The following reaction illustrates the preparation of the aminodiurea compounds:

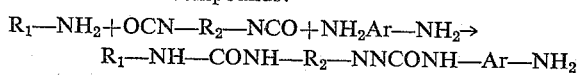

Minor amounts of other materials will be formed. However, the principal product will be the aminodiurea illustrated by the above formula. Examples of the other compounds which will be formed in small quantities are a diurea, which results from the reaction of two molecules of the monamine with one of the diisocyanate and longer polymeric compounds which result from reaction of more than one mole of the diamine with the diisocyanate.

The following examples illustrate the preparation of the aminodiurea intermediates. The examples are merely illustrative and not limiting.

*Example 1*

*Preparation of aminodiurea.*—21.6 gm. (0.20 mole) of meta-phenylenediamine, 60.0 gm. (0.20 mole) of tallow amine (octadecylamine) and ten gm. of an octylated diphenylamine oxidation inhibitor were heated together over a steam plate until the mixture became liquid. The melt was then added to 34.8 gms. of an 80:20 isomeric mixture of 2,4-, 2,6-toluene diisocyanate in 450 gm. of a paraffinic oil having a viscosity of 480 SSU at 100° F. This mixture was stirred in a high-speed blender and a grease formed immediately. The grease was then transferred to a beaker and hand-stirred until evolution of heat ceased. The grease was then milled in a three-roll mill, transferred to a shallow metal pan and heated at 340° F. for 1½ hours. The grease was stirred while being heated. It was then cooled and to a 482 gm. portion an additional 150 gm. portion of oil was added; the mixture was hand-mixed and milled on a three-roll mill. The resulting product was a thick, smooth, chocolate-brown grease containing 14.5% by weight of the thickener and about 1.5% by weight of the antioxidant.

As previously mentioned, the aminodiureas, as prepared in Example 1, are diazotized and coupled. The coupling reaction may be carried out in basic, neutral or weakly acidic solution. An amount of nitrous acid, or in this case, sodium nitrite, sufficient to diazotize one-half of the aminodiurea is added. Then the addition of a weak acid, such as acetic acid, accomplishes the coupling reaction. This procedure is illustrated by the following example:

*Example 2*

*Preparation of triazene.*—20 gms. (0.029 mole) of sodium nitrite was mixed into a base grease prepared according to the procedure of Example 1. The base grease contains 0.058 mole of aminodiurea. 1.75 gm. (0.029 mole) of glacial acetic acid were added slowly with thorough stirring. The grease became yellow, then after about two hours of mixing, it became orange in color. The grease was heated in an oven for three hours at 350° F. with occasional stirring, until the odor of acetic acid was no longer detectable. The grease was then milled in a three-roll mill until smooth. The resulting material had an ASTM dropping point of 500° F., $P_0$ 230 and $P_{60}$ 294 and had a deep red-brown color.

The following table summarizes data obtained by preparing greases following the general procedures of Examples 1 and 2, varying the ratios of acetic acid and sodium nitrite to the diurea. The data included are the ASTM Unworked Penetration ($P_0$), ASTM Worked Penetration ($P_{60}$), ASTM Dropping Point (DP), the molar equivalents of sodium nitrite and acetic acid to two moles of total aminodiurea and the percent thickener in the grease.

The following aminodiureas were coupled:

A. Aminodiurea prepared according to Example 1.
B. Animodiurea prepared according to Example 1 substituting p,p'methylene dianiline as the diamine.

The following base oils were employed:

C. California paraffinic base neutral oil having a viscosity of 480 SSU at 100° F.
D. Methyl phenyl silicone oil having a viscosity of 500 centistokes at 25° C.

In order to demonstrate the surprising effectiveness of the grease compositions of this invention in preventing wear and oxidation at high temperatures, a "thin film" oxidation test and a high-speed ball bearing test were employed.

The "thin film test" measured the ability of the grease compositions to maintain grease-like characteristics, particularly, the retention of pliability and resistence to oxidation under exposure of a thin film of grease to high temperatures. The test also indicated other grease characteristics, such as tendency to bleed, flake and become tacky. The thin film test was run as follows:

The grease to be tested was coated on a metal strip, the grease coating being of uniform dimensions: 1/32" thick, 7/8" wide, and 2½" long. This grease sample was placed in an oven maintained at 350° F. and observed at periodic intervals until the sample no longer existed as a grease. The "life" of the grease was the number of hours during which the grease could be so heated before it lost its grease-like characteristics, that is, the time at which the test sample became hard and brittle.

The "bearing life" for a particular grease composition was determined by the following test procedure, which is known as the Navy high-speed bearing test, as described in Federal Test Method 331.1. In this test, a ball bearing was operated at 10,000 r.p.m. continuously for approximately twenty-two hours at a temperature of 350° F. The apparatus was then cooled to room temperature during a period of two hours. The procedure of operation at 10,000 r.p.m. at the noted temperature and cooling was repeated until there was bearing failure.

The following table compiled results of the above-mentioned test performed on a grease composition prepared according to Example 2, using as a base lubricant, a California paraffinic neutral oil having a viscosity of 480 SSU at 100° F. The grease contained 10.2% of the triazene thickener and 1.0% dioctylated diphenylamine oxidation-inhibitor. For purposes of comparison, data from a grease containing 10.8% of an aminodiurea prepared according to Example 1 and 1.4% of the same oxidation inhibitor is included.

TABLE II

| Thickener | Thin Film Grease Life at 350° F., hr. | High Speed Bearing Performance at 350° F. | | |
|---|---|---|---|---|
| | | Bearing I Life, hrs. | Bearing II Life, hrs. | Average Life |
| Triazene | 708 | 433 | 483 | 460 |
| Aminodiurea | 380 | | | |

The data in the above table demonstrate the excellent oxidation resistance and high-speed lubrication characteristics of the grease compositions of this invention. Mineral oil based greases are generally unsuitable for prolonged use at temperatures above 300° F.; greases formulated for use under these conditions ordinarily require synthetic ester based oils. Thus, the substituted triazene thickeners of this invention allow an

TABLE I

| Grease | Aminodiurea | Base Oil | Mol. Eq., $NaNO_2$ | Mol. Eq., HOAc | Mole Ratio, $NaNO_2$/HOAc | Percent Thickener | ASTM DP | Unworked Penetration, $P_0$ | Worked Penetration, $P_{60}$ |
|---|---|---|---|---|---|---|---|---|---|
| 1 | A | C | 1.00 | 1.00 | 1.0 | 10.2 | 460 | 247 | 283 |
| 2 | A | C | 0.50 | 1.00 | 0.5 | 14.6 | 518 | 277 | 360 |
| 3 | A | C | 1.00 | 1.00 | 1.0 | 14.6 | 500 | 241 | 307 |
| 4 | A | C | 2.00 | 1.00 | 2.0 | 14.6 | 522 | 230 | 294 |
| 5 | A | C | 2.00 | 0.75 | 2.7 | 11.9 | 500 | 232 | 281 |
| 6 | A | C | 2.00 | 0.50 | 4.0 | 11.2 | 500 | 236 | 297 |
| 7 | A | C | 1.00 | 0.25 | 4.0 | 10.6 | 508 | 231 | 288 |
| 8 | A | D | 1.00 | 0.50 | 2.0 | 31.8 | 502 | 276 | 306 |
| 9 | B | C | 0.70 | 0.50 | 1.4 | 16.6 | 460 | 218 | 293 | important advance in enabling mineral oil based greases to perform adequately at high temperatures and speeds.

Lubricating oils which can be employed as base oils in the grease compositions of this invention include a wide variety of oils, such as naphthenic-based, paraffin-based, and mixed-base mineral lubricating oils. Other hydrocarbon lubricants, e.g., lubricating oils derived from coal products, and synthetic oils, e.g., alkylene polymers (such as polymers of propylene, butylene, etc., and mixtures thereof), alkylene oxide-type polymers (e.g., alkylene oxide polymers prepared by polymerizing the alkylene oxide, e.g., propylene oxide, etc., in the presence of water, or alcohols, e.g., ethyl alcohol), carboxylic acid esters (e.g., those which are prepared by esterifying such carboxylic acids as adipic acid, azelaic acid, suberic acid, sebacic acid, alkenyl succinic acid, fumaric acid, maleic acid, hexanoic acid, etc., with alcohols, such as butyl alcohol, hexyl alcohol, 2-ethyl hexyl alcohol, dodecyl alcohol, pentaerythritol, etc.). Other suitable base oils are liquid esters of acids of phosphorus, alkyl benzenes, polyphenyls (e.g., biphenyls and terphenyls), alkyl biphenyl ethers, etc. Especially suitable for high temperature use are the polymers of silicon; such as tetraethyl silicate, hexa (4-methyl-2-pentoxy) - disiloxane, tetraisopropyl silicate, hexa(4-methyl-2-pentoxy)-disiloxane, polymethyl siloxane, and polymethyl phenyl siloxane, etc. The base oils may also comprise mixtures of the aforementioned minerals and synthetic oils.

The grease compositions of this invention contain the substituted-triazene thickeners in amounts sufficient to thicken the oils to the consistency of greases. In general, in amounts of from 5 to 50% by weight are sufficient; amounts of from 10 to 30% by weight are preferred.

In addition to the thickening agents heretofore described, the grease compositions may contain other grease-thickening agents, oxidation inhibitors, viscosity improving agents, dyes, etc.

While in the presentation of this invention numerous examples have been given and the invention described with respect to certain embodiments, it is not so limited, and it is to be understood that variations and modifications which are obvious to those skilled in the art may be made without departing from the scope or the spirit of the invention, which is only to be limited by the appended claims.

I claim:
1. A grease composition comprising an oil of lubricating viscosity and, in an amount sufficient to thicken said oil to the consistency of a grease, a substituted triazene compound of the general formula:

wherein $R_1$ is selected from the group consisting of hydrocarbyl radicals of 2 to 32 carbon atoms, $R_2$ is a hydrocarbylene radical of 1 to 32 carbon atoms, and Ar is a divalent aromatic hydrocarbon radical of 6 to 15 carbon atoms.

2. The grease composition of claim 1 wherein the triazene is present in an amount of from 5 to 50% by weight.

3. The grease composition of claim 1 wherein the triazene is present in the amount of 10 to 30% by weight.

4. The grease composition of claim 1 wherein $R_2$ is an aromatic hydrocarbon radical of 6 to 15 carbon atoms.

5. The grease composition of claim 1 wherein $R_1$ is an alkyl radical of 1 to 22 carbon atoms, $R_2$ is an aromatic hydrocarbon radical of 6 to 15 carbon atoms.

6. A substituted triazene compound of the general formula:

wherein $R_1$ is selected from the group consisting of hydrocarbyl radicals of 1 to 32 carbon atoms, $R_2$ is a hydrocarbylene radical of 1 to 32 carbon atoms, and Ar is a divalent aromatic hydrocarbon radical of 6 to 15 carbon atoms.

References Cited by the Examiner

UNITED STATES PATENTS 2,710,841   6/1955   Swakon et al. _____ 252—51.5

DANIEL E. WYMAN, *Primary Examiner.*

IRVING VAUGHN, *Assistant Examiner.*

UNITED STATES PATENT OFFICE
CERTIFICATE OF CORRECTION

Patent No. 3,281,361            October 25, 1966

Theodore H. Koundakjian

It is hereby certified that error appears in the above numbered patent requiring correction and that the said Letters Patent should read as corrected below.

Column 5, line 27, for "ploymethyl phenyl siloxane" read -- polymethylphenyl siloxane --; column 6, line 11, for "2 to 32" read -- 1 to 32 --.

Signed and sealed this 5th day of September 1967.

(SEAL)
Attest:

ERNEST W. SWIDER            EDWARD J. BRENNER
Attesting Officer            Commissioner of Patents